United States Patent [19]

Shirako

[11] 4,368,497
[45] Jan. 11, 1983

[54] TAPE CASSETTE

[75] Inventor: Hideo Shirako, Hachioji, Japan

[73] Assignee: Olympus Optical Company Ltd., Tokyo, Japan

[21] Appl. No.: 220,901

[22] Filed: Dec. 29, 1980

[30] Foreign Application Priority Data

Feb. 20, 1980 [JP] Japan ............................ 55-21332[U]
Feb. 25, 1980 [JP] Japan ............................ 55-23748[U]
Feb. 25, 1980 [JP] Japan ............................ 55-23749[U]

[51] Int. Cl.³ ............................................ G11B 23/08
[52] U.S. Cl. .................................. 360/132; 242/199; 360/130.33
[58] Field of Search ........................ 360/132, 130.33; 242/199

[56] References Cited

U.S. PATENT DOCUMENTS 4,191,984  3/1980  Tsukidate ............................ 360/132

FOREIGN PATENT DOCUMENTS 50-6358    2/1975  Japan .
50-9000    3/1975  Japan .
50-69128   6/1975  Japan .
54-143123 11/1979  Japan ................................ 360/132
2016413    9/1979  United Kingdom ................ 360/132
2032388    5/1980  United Kingdom ................ 360/132

Primary Examiner—Alfred H. Eddleman
Attorney, Agent, or Firm—Weinstein & Sutton

[57] ABSTRACT

A tape cassette includes liner sheets which are flexed toward the inner surface of the adjacent cassette half in the region around openings, formed therein to permit tape hub drive shafts to extend therethrough, a central region adjacent to the front edge and at the opposite ends of the front edge, thereby allowing the liner sheets to control the position of a magnetic tape to stabilize the tape running and to prevent a deformed tape winding.

4 Claims, 6 Drawing Figures

TAPE CASSETTE

BACKGROUND OF THE INVENTION

The invention relates to a tape cassette which is used in a magnetic tape recorder, and more particularly, to an improved tape cassette which assures a smooth running of a magnetic tape contained therein.

As is well recognized, a tape cassette which is used in a magnetic tape recorder of the cassette type is provided with a variety of sophistications which are utilized in order to prevent a magnetic tape contained therein from becoming loose or deformed in its winding form, but the prior art approaches failed to provide a satisfactory solution to prevent these undesirable effects completely.

During a rapid advance or rewind mode, the tape runs at a higher speed, which may cause a lateral displacement of the tape, resulting in a deformed or offset or staggered winding. This increases the frictional resistance which the tape experiences during its running, whereby the running performance becomes unstable. In particular, with a tape cassette of a miniature size which is commonly referred to as MICRO-CASSETTE (registered trademark), there is a reduced distance from a point on an associated tape hub where the tape is delivered to a magnetic head, so that the use of tape guides is insufficient to bring the running tape into an optimum record/playback position with respect to the head, as considered in the lateral direction, resulting in the difficulty that the azimuth during the record/playback of the first surface (surface A) of the cassette is offset from that during the record/playback of the second surface (surface B) of the cassette. A support spring which is associated with tape pads is held between a spring abutment and another spring support post, both located within the cassette, and is subject to a degree of rattling in the lateral direction or in the direction of thickness of the tape cassette. Hence, it is impossible to bring and maintain the tape at the optimum record/playback position with respect to the magnetic head by the use of such pads alone.

One of the attempts which intended to eliminate such inconveniences of a conventional tape cassette is disclosed in Japanese Utility Model Publication No. 6358/1975 where ribs are mounted on the inner wall surface of a cassette half. With this arrangement in which no liner sheet is used and the tape bears against the ribs directly which are mounted on the inner surface of the cassette half, a shifting of the tape in the lateral direction during the tape running, in particular, during a rapid advance or rewind mode, is reduced, effectively preventing a deformed winding of the tape. However, the resulting smoothness of tape running is less than that achieved with the use of a liner sheet.

Accordingly, there has been proposed to provide ribs on the internal surface of the cassette half to control the position of a liner sheet so that a deformed winding of the tape may be prevented. Such a tape cassette is illustrated in FIG. 1. As shown, a tape cassette 1 is formed by a pair of upper and lower cassette halves 2, 3 carrying ribs 2a, 3a on their inner surfaces. The provision of such ribs reduces a displacement of the tape in the lateral direction as compared with the tape movement without them, but because the width of tape receiving surfaces of a pair of tape hubs 4, 5 is less than the distance between the aligned ribs 2a, 3a, a lateral displacement of tape hubs may occur depending on the machining accuracy thereof to cause an unstable tape running. A pair of upper and lower liner sheets 7, 8 are provided. Their ends, in particular, those of the upper liner sheet 7, depend downwardly outside the windings of tape 6 which are disposed on the tape hubs 4, 5, so that the edge of the tape 6 may move into contact with the liner sheets 7, 8 as the tape is being taken up on or delivered from the tape hubs 4, 5, resulting in a skewed running of the tape. This results in a deformed winding of the tape 6.

Another tape cassette is disclosed in Japanese Utility Model Publication No. 9000/1975 where a sheet having a low friction surface is disposed for receiving the edge faces of a tape winding disposed within the cassette. A deformation of the sheet is prevented by providing a plurality of projections extending from the inner surface of the cassette casing so that the sheet may be held in planar form parallel to the inner surface of the casing. Even though a number of projections may be provided to maintain the sheet in a plane which is substantially flush with the inner surface of the casing, an inherent deformation of the sheet may cause a skewed tape running and a deformed winding in the similar manner as mentioned above in connection with the tape cassette 1.

Japanese Laid-Open Utility Model Application No. 69,128/1975 discloses a further tape cassette in which a liner sheet extends to a point where it crosses a pad supporting spring. Even with this cassette, it is impossible to eliminate a rattling of the pad spring in the lateral direction perfectly.

SUMMARY OF THE INVENTION

It is an object of the invention to provide a tape cassette in which the spacing between aligned ribs mounted on the inner surface of a pair of upper and lower cassette halves is less than the width of tape receiving surfaces of the tape hubs and in which a portion of a liner sheet which is located adjacent to an opening formed in a tape hub to permit a drive shaft to extend therethrough is flexed toward the inner surface of the adjacent cassette half.

It is another object of the invention to provide a tape cassette in which the spacing between aligned ribs mounted on the inner surface of a pair of upper and lower cassette halves is less than the height of a tape pad supporting spring and in which a portion of a liner sheet located adjacent to its front edge is flexed toward the inner surface of the adjacent cassette half in a region adjacent to the tape pad supporting spring.

It is a further object of the invention to provide a tape cassette in which ribs mounted on the inner surface of a pair of cassette halves project beyond a plane defined by pins against which a liner sheet abuts so that a portion of a liner sheet is flexed toward the inner surface of the adjacent cassette half.

In accordance with the invention, a marginal edge portion of a liner sheet is forcedly flexed toward the inner surface of a cassette half, whereby an intermediate region of the liner sheet warps in the opposite direction or into the cassette. As a consequence, a pair of liner sheets hold the edge faces of tape windings with a force of a reduced magnitude. In this manner, a movement of the tape in the lateral direction is constrained by the liner sheets, effectively preventing a deformed tape winding.

A portion of the liner sheet which is located around an opening formed in a tape hub to permit a drive shaft to extend therethrough is forcedly flexed toward the inner surface of the cassette half. Forces acting on the tape hubs average the flexure of the upper and the lower liner sheet, with result that the tape hubs are centrally located by the liner sheets, thus effectively preventing a deformed tape winding which might otherwise occur as a result of a lateral displacement of the tape.

A median region of the front edge of the liner sheet is forcedly flexed toward the inner surface of the cassette half by the tape pad supporting spring, which is subject to the force which tends to average the flexure of the upper and the lower liner sheet, thus removing a rattling of the spring in the lateral direction.

The both ends of the front edge portion of the liner sheet are forcedly flexed toward the inner surface of the cassette half by pins against which the liner sheet abuts, so that the tape will be taken upon the tape hub while its lateral position is guided along the flexure in the liner sheet. In this manner, a deformed tape winding is avoided.

As an overall effect, the tape running is stabilized, and an offset in the azimuth when operating with either side of the cassette is eliminated, thus enabling a tape cassette to be provided which is adapted to provide a high fidelity operation.

DESCRIPTION OF THE PREFERRED EMBODIMENT

Figure 1:
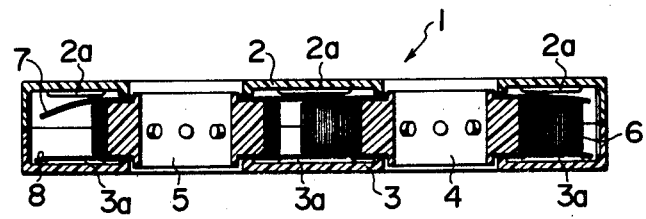
FIG. 1 is a cross section of an exemplary tape cassette of the prior art.
Figure 2:
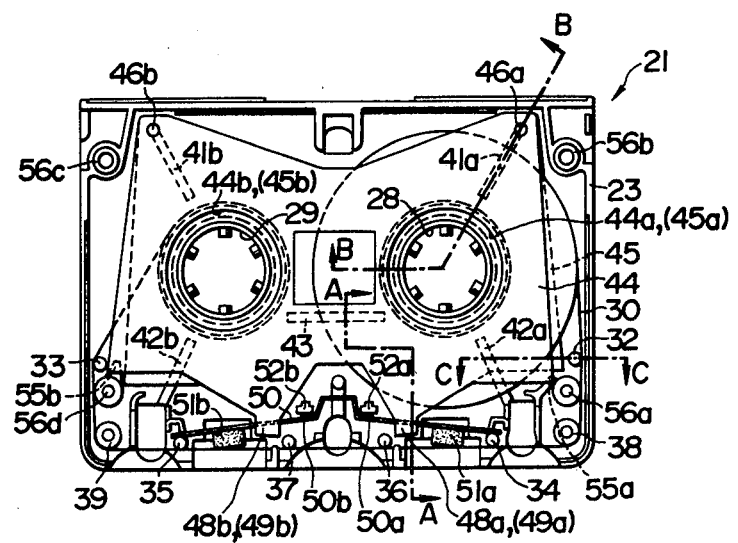
FIG. 2 is a plan view of a tape cassette according to one embodiment of the invention, with an upper cassette half being removed.

Referring to FIG. 2, there is shown, in plan view, a tape cassette according to one embodiment of the invention, with an upper cassette half being removed. A tape cassette 21 is constructed as a MICRO-CASSETTE (registered trademark) which is sized to be one-quarter that of a compact cassette. As in a compact cassette, it comprises an upper cassette half 22 (see FIGS. 3, 5 and 6) and lower cassette half 23, both of which are disposed in aligned relationship with each other.

The lower cassette half 23 is formed with tape hub locating apertures 25a, 25b (see FIG. 5) which are located centrally therein at laterally spaced positions. Annular hub abutments 27a, 27b (see FIG. 5) are disposed around the apertures 25a, 25b and project into the cassette 21. Formed on the inner surface of the lower cassette half 23 are ribs 41a, 41b, 42a, 42b which extend from points adjacent to the hub abutments 27a, 27b radially outward toward the individual corners of the cassette half 23. Also formed on the inner surface of the lower cassette half 23 is a rib 43 which extends lengthwise of the cassette half 23 at location slightly forwardly of a lateral centerline.

A lower liner sheet 45 is placed on top of the ribs 41a to 43, and is shaped in the form of a butterfly or swallow tail. However, it should be understood that it is somewhat asymmetrical with respect to a longitudinal centerline so that when it is turned upside down, it is completely aligned in configuration with an upper liner sheet 44. The liner sheet 45 is formed with openings 45a, 45b which are aligned with the tape hub locating apertures 25a, 25b formed in the cassette half 23 and which have a diameter slightly greater than that of the apertures 25a, 25b but is slightly less than the outer diameter of tape hubs 28, 29 to be described later. It will be appreciated that these openings and the apertures are provided to permit tape hub drive shafts to extend therethrough. A pair of tabs 49a, 49b extend forwardly from the front edge of the liner sheet 45 so as to define a fork.

Figure 6:
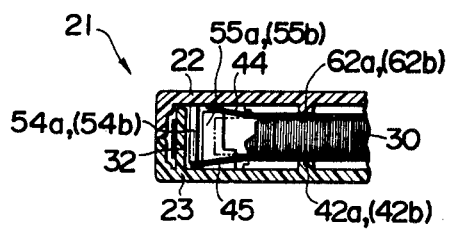
FIG. 6 is a fragmentary section of the cassette shown in FIG. 2 taken along the line C—C shown therein.

The liner sheet 45 is formed with positioning holes which are formed in the rear end thereof toward the opposite lateral ends and which are fitted over positioning pins 46a, 46b which in turn project from the lower cassette half 23 toward the rear corners thereof, whereby the liner sheet 45 is properly positioned. When so positioned, the openings 45a, 45b are aligned with the tape hub locating apertures 25a, 25b formed in the cassette half 23, and the tabs 49a, 49b extend to positions where they cross the lower end face of a tape pad supporting spring 50 to be described later. As shown in FIG. 6, the opposite lateral ends of the front edge of the liner sheet 45 are located in abutment against pins 54a, 54b mounted on the upper cassette half 22.

Figure 5:
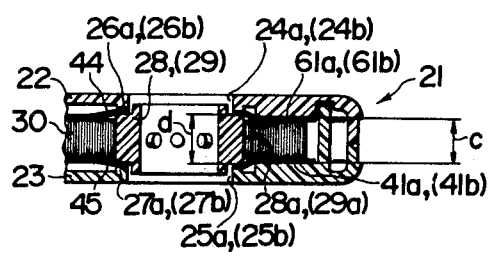
FIG. 5 is a fragmentary cross section of the cassette shown in FIG. 2 taken along the line B—B shown therein.

The pair of left- and right-hand tape hubs 28, 29 as well as the tape pad supporting spring 50 are disposed on top of the lower liner sheet 45. As shown in FIG. 5, the tape hubs 28, 29 are each in the form of a cylinder having a plurality of pins formed around its inner periphery for engagement with a tape hub drive shaft. The middle portion of the hubs has an increased thickness or a greater diameter than the upper and lower ends thereof, with its peripheral surface providing tape receiving surfaces 28a, 29a. The hubs 28, 29 are fitted into the hub locating apertures 25a, 25b formed in the lower cassette half 23 and are rotatable therein by being passed through openings 45a, 45b formed in the liner sheet 45. The opposite ends of the magnetic tape 30 are anchored to the respective hubs 28, 29 and their turns disposed thereon. It will be seen that the magnetic tape is passed around guide pins 32 to 37 and tape guide rollers 38, 39 so as to be maintained taut along the inside of the front wall of the tape cassette 21.

Figure 4:
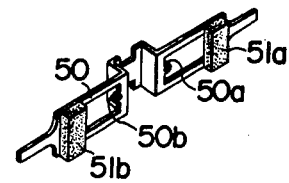
FIG. 4 is a perspective view of a tape pad supporting spring shown in FIGS. 2 and 3.

As shown in FIG. 4, the spring 50 comprises an elongate leaf spring which is centrally recessed and has openings formed in both limbs thereof. A pair of supports 50a, 50b are integrally formed with the spring along the inner edges of these openings while a pair of tape pads 51a, 51b are adhesively secured to the spring on the front face thereof at outer ends of the openings.

The tape pad supporting spring 50 is disposed toward the front of the cassette 21 by attaching the supports 50a, 50b thereof to a pair of spring support posts 52a, 52b which are centrally mounted on the lower cassette half 23 toward the front portion thereof. The spring 50 urges the pair of tape pads 51a, 51b toward windows formed in the front wall of the cassette 21 and which receive record and playback heads, respectively. However, the resulting movement of the tape pads 51a, 51b is limited normally by the abutment of the both ends of the spring 50 against the back of the guide pins 34, 35. It is to be noted that the spring 50 crosses the tabs 49a, 49b on the liner sheet 45 in a region intermediate the supports 50a, 50b and the tape pads 51a, 51b, respectively.

The upper liner sheet 44 is placed on top of the tape hubs 28, 29 and the supporting spring 50 thus arranged. As mentioned previously, the liner sheet 44 is configured to be congruent with the lower liner sheet 45 when reversed. It is positioned by fitting positioning holes formed in the rear portion thereof toward the both corners over positioning pins 46a, 46b mounted on the lower cassette half 23. When so positioned, a pair of openings 44a, 44b which are formed in the liner sheet 44 to permit tape hub drive shafts to extend therethrough are aligned with the tape hubs 28, 29, and tabs 48a, 48b extend from the front edge of the liner sheet 44 toward the center thereof and cross the supporting spring 50 on the upper side thereof. It is also to be noted that the both lateral ends of the liner sheet 45 are disposed in abutment against pins 55a, 55b formed on the lower cassette half 43 along the front edge of the liner sheet 45.

The upper cassette half 22 is placed on top of the liner sheet 44 in overlapping relationship with the lower cassette half 23 to form an enclosure. The upper cassette half 22 is centrally formed with a pair of laterally spaced tape hub locating apertures 24a, 24b (see FIG. 5), and annular hub abutments 26a, 26b (see FIG. 5) depend downwardly around the apertures 24a, 24b. The inner wall surface of the upper cassette half 22 is provided with ribs 61a, 61b, 62a, 62b, 63 (see FIGS. 3, 5 and 6) in alignment with the corresponding ribs 41a, 41b, 42a, 42b, 43 formed on the lower cassette half 23. Pins 54a, 54b (see FIG. 6) are formed on the upper cassette half, and the both lateral ends of the front edge of the lower liner sheet 45 bear against these pins.

The both cassette halves 22, 23 which are disposed in abutting relationship are secured together by engaging locking screws, not shown, into threaded holes 56a–56d formed in the four corners (the threaded holes in the upper cassette half 22 being not shown).

Figure 3:
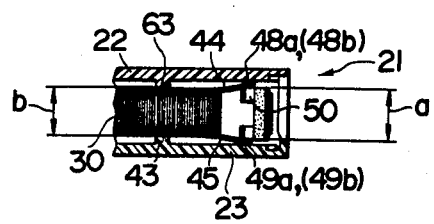
FIG. 3 is a fragmentary section of the cassette shown in FIG. 2 taken along the line A—A shown therein.

In its assembled condition, the cassette 21 is shown in FIG. 3, which indicates a section taken along the line A—A shown in FIG. 2. Thus, the rib 63 on the upper cassette half 22 opposes the rib 43 on the lower cassette half 23 and the spacing b therebetween is less than the height a of the tape pad supporting spring 50. Accordingly, the tabs 48a, 48b, 49a, 49b of the liner sheets 44, 45 bear against the lower and the upper end face, respectively, of the spring 50, and their free end is forcedly flexed toward the inner surface of the respective cassette halves 22, 23. It is a simple matter to choose the height of projection of the ribs 43, 63 so that the spacing b therebetween is less than the height a of the spring 50.

The cassette 21 in its assembled condition is also shown in FIG. 5 which shows a cross section taken along the line B—B shown in FIG. 2. Specifically, the ribs 61a, 61b on the upper cassette half 22 oppose the ribs 41a, 41b on the lower cassette half 23 with a spacing c therebetween, and the height of projection of the ribs 61a, 61b and 41a, 41b is chosen so that the spacing is less than the height d of the tape receiving surfaces 28a, 29a of the respective tape hubs 28, 29. Accordingly, portions of the liner sheets 44, 45 which are located around the openings 44a, 44b, 45a, 45b, formed therein to permit the respective hub drive shafts to extend therethrough, are forcedly flexed toward the inner surface of the individual cassette halves 22, 23 by means of the tape hubs 28, 29 and ribs 61a, 61b, 41a, 41b.

The cassette 21 in its assembled condition is also shown in FIG. 6 which indicates a cross section taken along the line C—C shown in FIG. 2. Specifically, the pins 54a, 54b mounted on the upper cassette half 22 and against which the liner sheet bears have their abutment surface located below the top of the ribs 42a, 42b on the lower cassette half 23, and the pins 55a, 55b on the lower cassette half 23 against which the liner sheets bears has its abutment surface located below the free end of the ribs 62a, 62b on the upper cassette half 22. Consequently, the both lateral ends of the liner sheets 44, 45 are forcedly flexed, along their front edge, toward the inner surface of the cassette halves 22, 23 by means of the ribs 62a, 62b, 42a, 42b and abutment pins 54a, 54b, 55a, 55b.

When the tape cassette 21 is assembled in this manner, the liner sheets 44, 45 have their tabs 48a, 48b, 49a, 49b, their portions around the openings 44a, 44b, 45a, 45b and the both lateral ends along the front edge thereof all flexed toward the inner surface of the cassette halves 22, 23, with consequence that the resilience of the liner sheets 44, 45 themselves act to warp them into the cassette 21 in the remaining regions, thus exerting forces which are effective to average the flexure of the opposing flexed portions.

The forces which are effective to average the flexure of the portions of the liner sheets located around the openings 44a to 45b act on the tape hubs 28, 29 in a manner such that the tape hubs 28, 29 are held between the upper and the lower liner sheet 44, 45 rather than abutting against the hub abutments 26a, 26b, 27a, 27b on the cassette halves 22, 23, whereby they are maintained in their central position. In response to the warp of the liner sheets 44, 45 into the cassette, the tape 30 is taken up on the individual hubs while the upper and lower end faces of successive turns thereof are urged against the liner sheets 44, 45, thus avoiding a deformed winding form. Since the tape 30 is held between the liner sheets 44, 45 together with the tape hubs 28, 29, there results a uniform loading torque which is independent of the length of tape disposed on the respective hubs 28, 29.

Since each of the liner sheets 44, 45 contacts the tape pad supporting spring 50 at the pair of tabs 48a, 48b, their flexure is maintained in a stable manner. Conversely, because the spring 50 is held between the liner sheets 44, 45, the spring 50 itself is centrally located to improve the positional relationship between the pads 51a, 51b and the record/playback head, removing any rattling of the spring 50 in the lateral direction.

Since the both lateral ends of the liner sheets 44, 45 are flexed in the lateral direction along their front edge, the sides of the tape 30 cannot contact the liner sheets 44, 45 once the tape leaves the hubs 28, 29 even if there is a certain degree of flexure in the initial configuration of the liner sheets 44, 45 during the assembly, thus allowing a stable running of the tape 30. If the tape 30 is displaced laterally to a certain degree as it is taken up on either tape hub 28, 29, the lateral position of the tape 30 is corrected by the flexure of the liner sheets 44, 45 as it is being disposed thereon, thus providing a neat winding form. The resilience of the flexed liner sheets 44, 45 avoids a deformed winding form since the both end faces of successive turns of the tape 30 are always urged by the liner sheets 44, 45.

Therefore, there occurs no movement of the tape 30 in the lateral direction during the tape running, thus providing a tape cassette of high performance which avoids a stepped or staggered winding of successive turns of the tape 30 and also avoids a misalignment of the azimuth between the both sides of the cassette.

What is claimed is:

1. A tape cassette comprising:

a pair of tape hubs including openings which are engaged by tape hub drive shafts and rotatably disposed in tape hub locating apertures which are formed in a pair of upper and lower cassette halves at laterally spaced positions, said tape hubs having upper and lower surfaces separated by tape receiving surfaces;

a pair of liner sheets disposed along the respective inner surfaces of the upper and lower cassette halves and having a pair of openings formed therein at laterally spaced position, the openings being of a diameter which is slightly less than the diameter of an outer peripheral surface of the respective tape hubs on which a tape is disposed, the openings permitting the drive shafts to extend therethrough; and ribs formed on the inner surface of the upper and lower cassette halves in alignment with each other, the spacing between the ribs being less than the height of tape receiving surfaces of the tape hubs so that portions of the liner sheets which are located around the openings formed therein and overlap said upper and lower surfaces of said tape hubs are thereby flexed toward the inner surface of the adjacent cassette half in the region of the tape hub.

2. A tape cassette formed by a pair of upper and lower cassette halves disposed in opposing relationship with each other, comprising a tape pad supporting leaf spring disposed centrally toward the front side of the cassette and within the latter;

a pair of upper and lower liner sheets disposed along the inner surface of the upper and lower cassette halves and having extensions for abutment against the both edge faces of the tape pad supporting leaf spring;

and ribs formed on the inner surface of the upper and lower cassette halves in alignment with each other, the spacing between the ribs being less than the height of the leaf spring so that a median region of the front edge portion of the liner sheets are flexed toward the inner surface of the adjacent cassette half in the region of the leaf spring.

3. A tape cassette formed by a pair of upper and lower cassette havles, comprising:

a pair of upper and lower liner sheets disposed along the inner surface of the respective cassette halves;

upper and lower abutment pins formed on the inner surface of the upper and lower cassette havles and having abutment surfaces on which said liner sheets bear to cause part of the liner sheets to be directed toward the inner surface of the adjacent cassette half; and ribs formed on the inner surface of the upper and lower cassette havles and projecting beyond the abutment surfaces of the abutment pins so that part of the liner sheets is flexed toward the inner surface of the adjacent cassette half in the region of the abutment pin.

4. A tape cassette according to claim 3 in which the part of the liner sheet comprises the both lateral ends of the front edge portion of the liner sheets.

* * * * *